US00RE44743E

(19) United States
(12) Reissued Patent
Topiwala et al.

(10) Patent Number: US RE44,743 E
(45) Date of Reissued Patent: Feb. 4, 2014

(54) METHODS AND APPARATUS FOR THE COMPOSITION AND COMMUNICATION OF DIGITAL COMPOSITION CODED MULTISENSORY MESSAGES (DCC MSMS)

(71) Applicants: Pankaj N. Topiwala, Cocoa Beach, FL (US); Jay C. Topiwala, Seattle, WA (US)

(72) Inventors: Pankaj N. Topiwala, Cocoa Beach, FL (US); Jay C. Topiwala, Seattle, WA (US)

(73) Assignee: FastVDO LLC, Cocoa Beach, FL (US)

(21) Appl. No.: 13/776,367

(22) Filed: Feb. 25, 2013

Related U.S. Patent Documents

Reissue of:
(64) Patent No.: 8,107,599
Issued: Jan. 31, 2012
Appl. No.: 11/354,802
Filed: Feb. 15, 2006

U.S. Applications:
(60) Provisional application No. 60/653,022, filed on Feb. 15, 2005.

(51) Int. Cl.
*H04M 1/64* (2006.01)
*G06F 3/00* (2006.01)

(52) U.S. Cl.
USPC ..... 379/88.17; 715/700

(58) Field of Classification Search
USPC ..... 715/700; 379/88.17; 340/576
See application file for complete search history.

(56) References Cited

U.S. PATENT DOCUMENTS

| | | | | |
|---|---|---|---|---|
| 4,660,031 | A * | 4/1987 | Buchas | 345/56 |
| 6,965,926 | B1 * | 11/2005 | Shapiro et al. | 709/219 |
| 6,967,594 | B2 * | 11/2005 | Gerrity | 340/963 |
| 7,349,739 | B2 * | 3/2008 | Harry et al. | 607/49 |
| 7,382,482 | B2 * | 6/2008 | Silverbrook et al. | 358/1.15 |
| 7,426,533 | B2 * | 9/2008 | Malone et al. | 709/203 |
| 7,779,166 | B2 * | 8/2010 | Grant et al. | 710/5 |
| 2003/0174060 | A1 * | 9/2003 | Gerrity | 340/576 |
| 2006/0166620 | A1 * | 7/2006 | Sorensen | 455/41.1 |

* cited by examiner

*Primary Examiner* — Mohammad Islam
(74) *Attorney, Agent, or Firm* — Fenwick & West LLP

(57) ABSTRACT

Disclosed are methods and apparatus for composing and communicating Digital Composition Coded Multisensory Messages (DCC MSMs). The present invention also relates to the design, composition, creation, and communication of the multisensory messages. Multisensory messages, while rich in content and meaning, are to be composable from a great variety of platforms, from cell phones to mainframes.

69 Claims, 4 Drawing Sheets

METHODS AND APPARATUS FOR THE COMPOSITION AND COMMUNICATION OF DIGITAL COMPOSITION CODED MULTISENSORY MESSAGES (DCC MSMS)

Matter enclosed in heavy brackets [ ] appears in the original patent but forms no part of this reissue specification; matter printed in italics indicates the additions made by reissue.

CROSS REFERENCE TO RELATED APPLICATIONS

This application relates to and claims priority under 35 U.S.C. §109(e) from U.S. Provisional Application Ser. No. 60/653,022, filed Feb. 15, 2005, entitled "a method and apparatus for the composition and communication of digital composition coded multisensory messages (DCC MSMS)", the contents of which are incorporated herein by reference.

FIELD OF THE INVENTION

This invention relates to systems, code, apparatus, and methods for the composition and communication of rich media and multisensory messages. The invention also relates to the design, composition, creation, and communication of such rich messages. Such messages, while rich in content and meaning, are to be composable from a great variety of platforms, from cell phones to mainframes.

BACKGROUND OF THE INVENTION

Email messaging has been an active field for nearly twenty years, leading to today's leading messaging tools and services including:

1. AOL Messenger,
2. Yahoo! Messenger,
3. MSN Messenger,
4. Skype.

All of the existing messaging systems deal with one or both of the two standard live sensor feeds (microphone, webcam). In addition, they have very limited computer graphics associated with them: simple avatars, smiley faces. There are no stored sensor data used in today's applications. There is no composition of multiple, multidimensional, or mixed signals (live, stored, etc.). There is definitely no Digital Composition Codebook, as per our development below. From our perspectives, these early applications are just scratching the surface of what is to come, but can't predict or even suggest the future of rich media multisensory communications. Nevertheless, rich communications can be enabled with technology we have today, by dramatically altering the way in which messages are constructed and delivered, our main advances.

FIG. 1 illustrates the current generation messaging tools: Skype (for voice only), and Yahoo! Messenger for voice, video, and text (as displayed). The limit of computer graphics presented in these tools is the tiny presence of the smiley faces near the bottom of the Instant Message screen. There are no stored videos of sound clips, and there definitely are no tools for the composition of a multimedia message (much less a multisensory message).

FIG. 2 illustrates the current generation of smilies, avatars, and icons. These are generally a composite of several images (often just two), stored in the "gif" format, which permute ("animated gifs") to give an impression of action. These are the first inklings of a future use of stored graphics in rich media messaging, as we envision it. Today, these are limited by bandwidth and computational resources at either end of the communication—bottlenecks we overcome.

FIG. 3 illustrates a more sophisticated structure, called 3D icons/avatars, being wireframe models that can be manipulated, are currently available as desktop add-ons (for example in screensavers), and sometimes for chat rooms, but are not generally part of messages—they require significant additional tools that are not commonly available. The creation of tools for the efficient representation and manipulation of multi-signal objects, and a method for their widespread availability for enhanced communications, are also part of this invention.

The existing messaging systems such as AOL, Yahoo!, MSN, and Skype, permit the creation and transmission of messages based on the use of microphones, webcams, and text, as well as file inclusions—all of which we will refer to as direct entry data (DED). The sensory data today is limited to sight and sound, and only that which is live-fed. In addition, there is only a hint of additional use of computer-generated effects (simple avatars, smiley faces, etc). In fact, the main purpose of these additional computer-generated effects has been to represent a person in case the video signal can't be transmitted, a situation that is common since it is quite difficult to transmit video in today's limited bandwidth environment.

In experiments we have conducted as of the date of this filing, we generated video at less than one frame per second—i.e., these were only still images! At worst, the images froze altogether. This bandwidth paralysis, complicated by the need for high computing resources for the management of compression/decompression and channel negotiation, which are still not being met by the latest generation Intel Pentium processors, may be hampering the vision of developers currently in this field. As we look ahead, we see an era when bandwidths, resources (especially at central server farms), and the opportunity to communicate richly will be ever present and in high demand. There is a need, however, for methods of performing such functions on common communications devices which will be functionally limited for the foreseeable future (e.g., cell phones).

SUMMARY OF THE INVENTION

The present invention relates to a method for composing and communicating Digital Composition Coded Multisensory Messages (DCC MSMs), comprising the following steps:

a. Utilizing any combination of live sensor-based, real-time generated, or pre-established databases of stored, Multisensory Objects (MSOs), stored locally or at remote servers,
b. Said Multisensory Objects (MSOs) being composed of any digital signals that are amenable, upon conversion, to human or machine interpretation, including organic sensory signals corresponding to sight, sound, touch, smell, and taste, and further including as examples any combination of live sensor feeds, such as from microphones, imaging and video sensors, and tactile, olfactory, and taste sensors, as well as video clips, sounds, plain text, text objects, animations, images, cartoons, animated figures, avatars, wireframe models, 3D graphics, speech, music, geometric patterns, animated text, colors, patterned backgrounds, and computer or machine-generated graphics, as well any combination of stored tastes, smells, and tactile impressions that are digitally represented, c. Composition of structured, Multisensory Message (MSMs) using any combination of at least one of these Multisensory Objects, specifically including live-fed or stored sensor data such as sounds, images or video clips, and specifically using an intuitive authoring tool in the form of an Authoring Appliance (AA), in either software or hardware, and residing either at the user terminal in whole, or (partly) at a remote Rich Message Server, d. Said Authoring Appliance (AA; henceforth we use the term "Appliance" to mean either a software application or a hardware device, or a combination thereof), presented as an intuitive authoring tool, allowing for the unique and rich combination, integration, superposition, multiplexing of various source data, and compression, incorporating any variety of fades, transitions, juxtapositions, etc., of the various MSOs, according to specific and specialized instructions, as part of a specialized Digital Composition Codebook (DCC), e. Said specialized instructions being drawn from a Digital Composition Codebook (DCC), a detailed, articulated, yet intuitive MSM construction regimen of codes for message composition, such instructions being formulated in either real-time or by the partial or full use of prerecorded instructions, by either the MSM author or multiplicity of authors, or provided by the AA, and being comprised of i. a variety of shorthand codes, ii. each shorthand code being either a composite or elementary code, iii. each composite code being comprised of elementary codes iv. and each elementary code comprised of actions which are registered with the AA either by human or machine, using machine equivalents, f. Said actions being comprised of i. key strokes, ii. pressing or maneuvering of buttons, handles, steering wheels, or foot pedals, iii. voice commands or voiced sounds, iv. hand movements or gestures, v. eye moments or blinks, vi. body movements or gestures, vii. handwritings or drawings, viii. finger movements or figures, ix. facial movements or gestures, x. any prerecorded combination of such instructions, collected and represented as a database of instructions (e.g., coded instructions for more complicated instructions), xi. any machine equivalent of such actions, g. Said multi sensory object (MSO) databases being located either within a software or hardware application platform, either locally at the user's terminal, or remotely at a Rich Message Server, with the service provided in a client-server architecture, said remote server being connected via a network to the end user terminals, h. Said Rich Message Server being a network connected computing resource warehousing databases of signals, as well as the receiving, compositing, storing and forwarding station for the rich messages, as commanded and intentioned by the user using live feeds and codes, i. Transmitting such a Multisensory Message via a digital encoding of the message using an Encoding Engine (EE), and conveying it over any of a variety of transmission channels, j. Said digital encoding using a specialized Encoding Engine (EE) comprising the conversion to a compact, digital representation, in a form acceptable at the receiving end, as a combination of signal codes and actual compressed signal, via encoding instructions, whether in hardware or software, for the collection, conversion to digital, multiplexing, overlay, superposition, preprocessing, compression, signal coding, encryption, channel coding, and packetization, of the various components of the MSM, for the efficient transmission and rendering of the MSM signal, k. Said transmission channels being comprised of (j1) any of Internet-protocol (IP) based channels, such as local-area networks, wide-area networks, Internet, extranets, virtual-private networks, satellite communications networks, wireless networks IP including ad-hoc wireless networks; (j2) Plain Old Telephone System (POTS); (j3) other wireline non-IP networks such as cable networks, (j4) over-the-air broadcast, (j5) non-IP based satellite, air-to-air, air-to-ground, ground-to-ground, or underwater communications channels, or (j6) physical medium, such as a digital media disk (e.g., CD, DVD), computer hard drive, memory stick;

l. Receiving of such a MSM on a receiver platform, via a combination of software or hardware mechanisms, in a Receiver Appliance (RA), and decoding the received signal using a Decoding Engine (DE), to provide a Rich Sensory Experience (RSE) to the receiving party, whether human or machine, m. Said Decoding Engine comprising instructions, whether in hardware or software, for the depacketization, decoding, decryption, demultiplexing, decompression, signal decoding, refragmentation, reconversion to analog, and reconstitution and rendering of a Rich Sensory Experience (RSE), n. Said Rich Sensor Experience (RSE) comprising the rendering of none, some, or all of the multisensory object components, wherein some components may be altered or edited according to conditions of the signal and its transmission, lost data, and/or by preinstructed or real-time rules developed by the receiving party and prescribed at the Receiving Appliance (RA), o. Said pre-instructed or real-time rules for editing or alterations being in the nature of modifications or deletions of any aspect of the MSOs, whether for purposes of error masking, language, content, taste, color, sound or music preferences, sensory taste, smell or tactile preferences, or specializations appropriately scalable to the limitations or conditions of the Receiving Appliance.

DETAILED DESCRIPTION OF THE PREFERRED EMBODIMENTS

Before the present invention is described, it is understood that this disclosure is not limited to the particular devices, methodology and components described as these may vary. It is also to be understood that the terminology used herein is for the purpose of describing particular embodiments only, and is not intended to limit the scope of the present invention which will be limited only by the appended claims.

Figure 1:
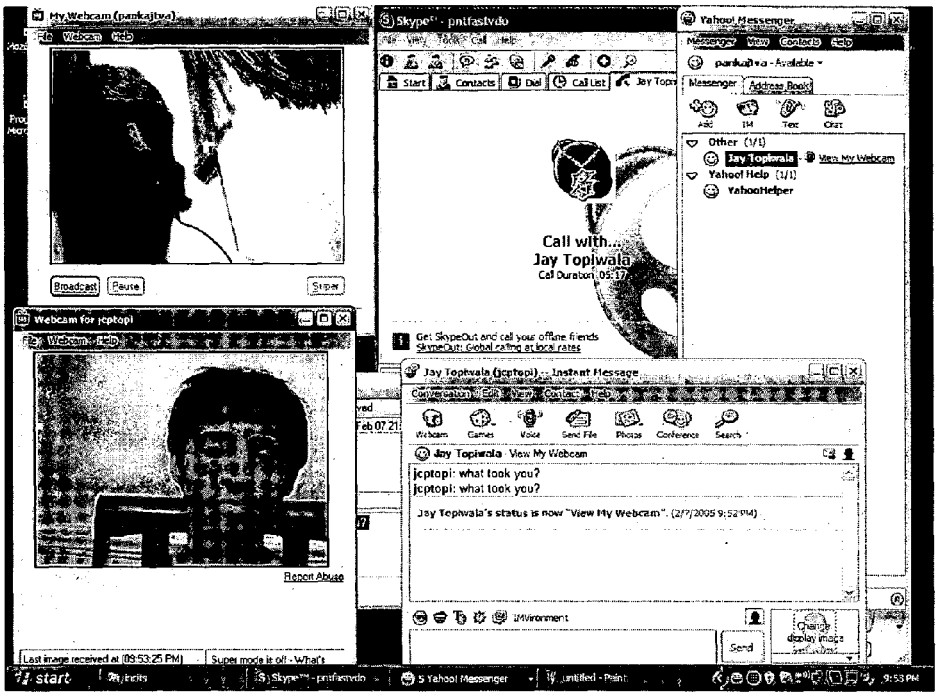
FIG. 1 illustrates an example of existing messaging tools.
Figure 2:
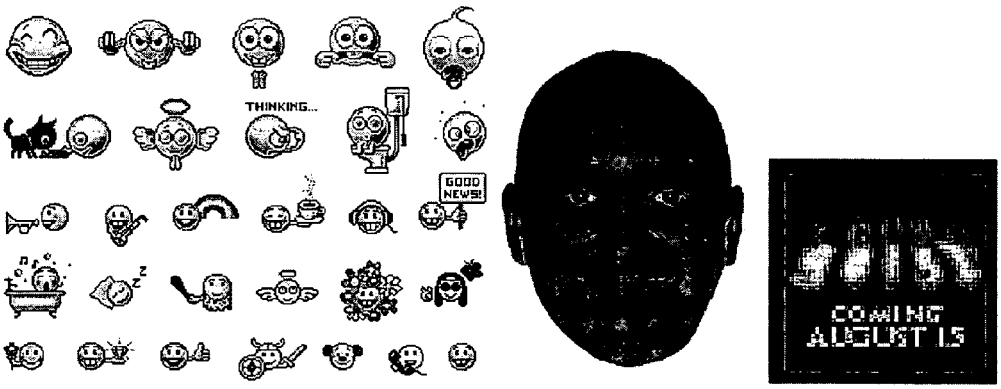
FIG. 2 illustrates exemplary emotion icons used by the existing messaging tools.
Figure 3:
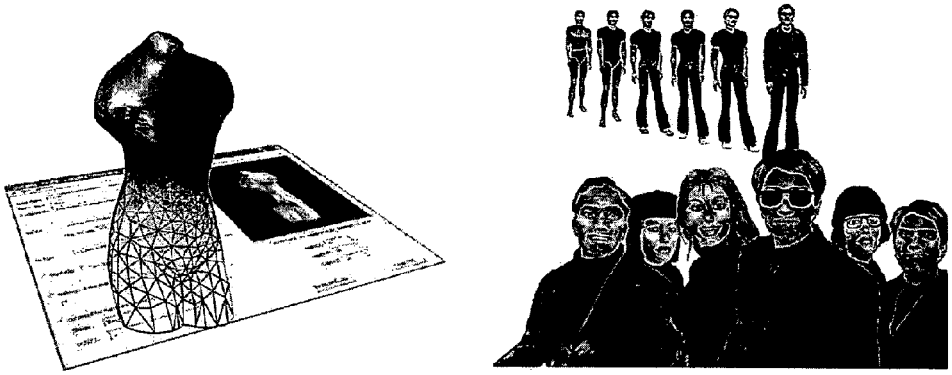
FIG. 3 illustrates a more sophisticated 3D icons/avatars structure.
Figure 4:
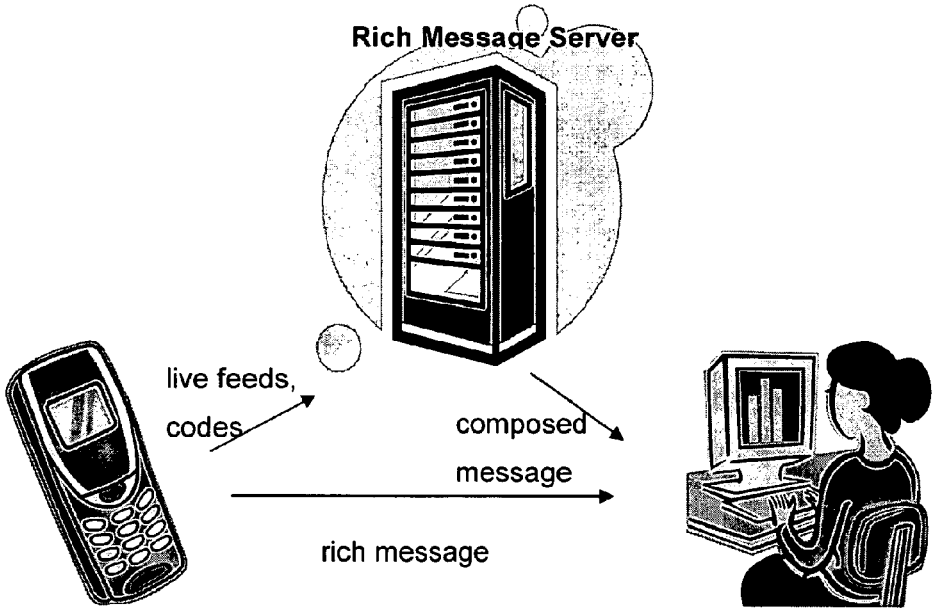
FIG. 4 illustrates the architecture and example usage of the Rich Message Server and Digital Composition Codebook framework of the invention.

Special Terms Used:

MSM—Multisensory Message
MSO—Multisensory Object
RMS—Rich Message Server
DCC—Digital Composition Codebook
AA—Authoring Appliance
RA—Receiving Appliance
EE—Encoding Engine
DE—Decoding Engine
RSE—Rich Sensory Experience To achieve rich communication, our key departures from prior art are fourfold. The central use of stored multimedia and computer graphic data, in addition to the DED data, as well as specifically the direct and convenient manipulation of the multimedia data to be presented at the receiver, as a massive communication-enabler, far enhancing the experience possible with just the two live feeds in use today (microphone, webcam). The fundamental use of client/server based architectures for remote message composition and delivery, where multimedia data is collected, warehoused, manipulated, and messages are constructed, and finally saved for suitable transmission and forwarding. The only things to be sent to the server are the live sensor feeds, plus coded instructions for composing the message from the live feeds and the stored graphics files. Note that while server-enabled communication exists in prior art, the server was used merely as a relay station of an existing message, not as a central composition station of an intended message, as shown in FIG. 4. The tailored, scalable delivery of rich messages is designed to suit client capabilities. The explicit construction of an extended framework to include truly multisensory input, whether from multiple and varied imaging or audio sensors, or sensors relating to the other senses completely unrepresented in today's dialog: touch, smell, and taste. In the future, as new technologies for the representation and conversion of sensory data for these additional senses inevitably become available, their inclusion into our communications medium will be groundbreaking additions to our currently sight/sound-limited world, permitting fully multisensory messages (MSMs).

FIG. 4 illustrates the architecture and example usage of the Rich Message Server and Digital Composition Codebook framework of the invention. Video, voice and composition codes are fed from a user cell phone to a server, which then composes a rich message to forward. A registered rich media client interprets the message. Delivery is in a format tailored to client capabilities.

In a sense, we are enabling the author of a message, be it from a cell phone/PDA, a TV, or a computer terminal for example, to have the equivalent capabilities of a Hollywood film director (and much more so in the multisensory context). Such a film director not only acquires raw film and sound footage, but then engages in considerable mixing and editing of the raw footage (plus text, animations, etc.) to composite a highly crafted communications medium—a motion picture. The art of movie editing, graphics compositing and final drafting is an advanced and fine art, populated with skilled artisans in the field, requiring considerable training, apparatus, expense, and manpower.

Today, such multimedia editing is done using sophisticated and powerful computer equipment, in which the various data sources are mapped to a timeline, typically in a hardware-assisted software tool; for example, the company Avid (www.avid.com) makes a living providing such editing solutions to the film and television industry. Consumer-level versions of such editing tools are provided by companies such as Adobe (www.adobe.com, e.g., Adobe Premiere) and Pinnacle (www.pinnaclesystems.com), and entry-level tools are even provided as part of Microsoft Windows XP (e.g., MovieMaker). But all of these tools still require considerable familiarity with the mechanics of video and audio formats, compression technologies, container formats, etc.; i.e., they are far too cumbersome for use by the typical message author—e.g., a cell phone user. This invention deals with how to make rich messaging possible even for them.

First, in our parlance, a message is any conveyance of information, prepared for man or machine interpretation. This could include anything ranging from an email or voice message, up to a motion picture, and beyond. For purposes of further precise discussion though, we focus on the realm of personal messages, which are reincarnations of past language-based communications. Our claims, however, apply to the full spectrum of messages in general, but specifically limited in the architecture of how these messages are constructed and transmitted.

While the author of a personal message cannot engage in the fine art of film editing in its considerable complexity, the central advance of this invention is to provide a rudimentary but powerful capability for video, audio, graphics and other multisensory data editing to the message author, made available in the simplest possible user-friendly form, which can dramatically empower the sender to quickly produce an engaging message. The central nerve of our method and invention is use of remotely warehoused multimedia data, and the creation and use of a digital composition codebook (DCC), providing advanced but elegantly simple authoring of a rich message using a combination of live and stored multisensory data.

Elementary Examples of DCC Codes (e.g., for a computer terminal):

1. (v12,a9,t10)\/(v23) could mean multiplex stored videoclip12 with audioclip9, use the first 10 seconds, fade these in and out with videoclip23.
2. (lm,t3)|(a21/,t2) could mean use live media (camera, mike) for 3 seconds, cut, and use audioclip21, ramping up the sound from zero to full in 2 seconds, and stop.
3. (lm/a8) could mean simply live media overlay with audioclip8. This can be real-time.

These same codes can be tailored (by symbol substitutions) for cells/pdas. Note that with the stored data of example 1, the message to send is very compact (just that text, compressed, needs to be sent), taking up only 100 bytes of data. In example 2, there are also live feeds, from video and audio, as well as use of stored sensor data; in this case, the live feeds have to be compressed, multiplexed, and transmitted, received, demultiplexed, decompressed, and rendered, along with the stored audio clip. This particular message may require on the order of 1 MB of data for transmission, which may be transmitted over an IP network such as the Internet.

In these examples, the stored video and audio clips, whose labeling may be adjusted to the user's preferences, could be part of the applications at either end—for example, part of software applications, residing on computers at either end. Or, more conveniently, they could be warehoused at an external server database, which both sender and receiver have access to via a network, and which they access via a client-server architecture. This allows a far larger, more diverse, database of stored graphics, as well as richer composition capability. In addition, the server can forward a message scalable to the receiver capabilities.

Furthermore, note the context-dependency of these elementary codes sent: in example 1, the '\/' meant fading the video from one to the other (including the audio tracks); in example 2, with only one audio track in the second segment, the interpretation of '/' is to ramp up the audio. In 3, with mixed signals, it is an overlay. As a dictionary of such elementary codes are developed and mastered by user, user-specific layers of codes can be developed (codes of codes), permitting considerable shorthand and translation in the composition of such a multisensory message.

These digital composition codebooks (DCCs) can be initially supplied by the developers, but a significant point of this invention is also to allow the users the flexibility to develop their own shorthand codes (and codes of codes) as they are most comfortable with. This allows each user to achieve the convenience and simplicity that he/she needs and wishes, without in any way burdening the user of this technology. Note that while users may not achieve the full breadth of capabilities this way, they can easily achieve their intended vocabulary of compositions.

Examples of New Rich Messages, Previously Unavailable:

1. An excited girl exclaims "yikes!" and finishes with a quick clip of a crushing boulder falling, or an atomic explosion, with a "boom" sound. In the received video, the boulder (or the bomb) falls on the head of an intended victim whose stored clip is available at the server.
2. A teenage boy closes a message with: "take this", with a live feed of him swinging a fist, ending in a clip of a favorite boxer delivering a winning punch. In the message, the live feed is blended into the boxer's punch, heightening the experience.
3. A romantic message with a live feed of a blown kiss is mixed into a clip (or clips, in quick succession) of a famous kiss(es) from a movie(s), set to favorite music (not just as in the movie(s)). Moreover, at the receiver, a stored clip of the receiving party can be blended into the scene, delivering a "private" kiss in a public (movie) setting. Scrolling text message overlay, converted from speech (or reverse, from text to speech overlay): "See you soon."

All of these types of message compositions can be accomplished at the Rich Message Server, using state-of-the-art techniques for multimedia representation, manipulation and advanced processing, if the intended actions are suitably conveyed. Their use in rich messaging is entirely new, and enabled by coded intention, server-based composition, and scalable delivery. It is the subscribed establishment and encoded conveyance of these intended actions that we now mainly focus, using Digital Composition Codebooks.

The invention claimed is:

1. A method for communicating digital composition coded or structured multisensory messages in a communications system comprising a user input device, a rich message server, a receiving device and network connections, the method comprising:

at a user input device:

receiving a set of user input commands using coded instructions for composing a structured multisensory message from one or more multisensory objects, wherein the multisensory objects include a combination of live sensor feeds or stored data residing at the user input device (user data) or at a remote server (server-side data), wherein the user-input commands are created using an intuitive authoring tool and including one or more shorthand instruction codes drawn from a digital composition codebook, wherein the digital composition codebook is a construction regimen of instruction codes which are system- or user-predefined, pre-recorded, or are formulated in real-time by the user of the user input device through a combination of buttons, actions, or gestures, and are learned by a combination of the user input device and the rich message server, utilizing signal processing and machine learning techniques, wherein the one or more shorthand codes are composition instructions that define how the one or more multisensory objects are to be composed for presentation at the receiving device; and encoding and communicating the combination of user input commands, user data and references to server-side data to the rich message server;

at the rich message server, composing, storing and transmitting a structured multisensory message as defined by the user, comprising:

receiving and decoding the user input commands, the user data, and any references to server-side data from the remote user input device;

interpreting or learning a meaning of the user input commands having one or more shorthand instruction codes through context or training;

organizing the combination of multisensory objects in or referenced by the user data and server-side data;

compositing the one or more multisensory objects into a structured multisensory message in accordance with the user input commands for presentation on the receiving device and consistent with the capabilities of the receiving device and network connections; and encoding and communicating the structured multisensory message to the receiving device;

at a receiving device, presenting a rich sensory experience as defined by the user, comprising:

receiving and decoding a structured multisensory message from the rich message server; and converting and rendering the structured multisensory message into a rich sensory experience as defined by the user, scaled to the capabilities of the receiving device.

2. The method of claim 1, wherein at least one of the one or more multisensory objects is stored remote from the user input device.

3. The method of claim 1, wherein the user-input command is user-specific and the interpretation of the user-input command is learned by a combination of user input device and the rich message server, utilizing signal processing and machine learning techniques.

4. The method of claim 1, wherein the rich message server encodes the composited multisensory message for presentation on the receiving device.

5. The method of claim 1, wherein the user-input commands are for the presentation of multisensory objects that represent more than two different senses.

6. A method of using a user device to send a digital composition coded or structured multisensory message, comprising:

receiving at the user device as input from a user a set of user input commands using coded instructions for composing a structured multisensory message from one or more multisensory objects, wherein the multisensory objects include a combination of live sensor feeds or stored data residing at the user device (user data) or at a remote server (server-side data), wherein the user-input commands are created using an intuitive authoring tool and including one or more shorthand instruction codes drawn from a digital composition codebook, wherein the digital composition codebook is a construction regimen of instruction codes which are system- or user-predefined, pre-recorded, or are formulated in real-time by the user of the user device through a combination of buttons, actions, or gestures, and are learned by either the user input device or a rich message server, wherein the one or more shorthand codes are composition instructions that define how the one or more multisensory objects are to be composed for presentation in the structured multisensory message; and encoding and transmitting the combination of user input commands, user data and server-side data to a rich message server for interpretation of the user-input commands, editing of the one or more multisensory objects in accordance with the user input commands, composition of the structured multi sensory message from the one or more multisensory objects, and encoding of the structured multisensory message prior to the presentation of the multisensory message to an end user.

7. The method of claim 6, wherein the user-input commands are received using tactile input by the user.

8. The method of claim 6, wherein the user-input commands are received using a camera, signal processing and machine learning techniques.

9. The method of claim 6, wherein the user-input commands are received using voice commands, signal processing and machine learning techniques.

10. The method of claim 6, wherein the user-input commands are received using eye movements, signal processing and machine learning techniques.

11. The method of claim 6, wherein the user-input commands are received using handwritings or drawings, signal processing and machine learning techniques.

12. The method of claim 6, wherein the user-input commands are received using finger movements, signal processing and machine learning techniques.

13. The method of claim 6, wherein the one or more shorthand codes are used to integrate multiple multisensory objects for presentation.

14. The method of claim 6, wherein the one or more shorthand codes are user-specific and the interpretation of the one or more shorthand codes is learned by a combination of the user input device and the rich message server.

15. The method of claim 6, wherein at least one of the one or more multisensory objects is stored remote from the user input device.

16. The method of claim 6, wherein the user-input commands are for the presentation of multisensory objects that represent more than two different senses.

17. A method of using a rich message server for serving digital composition coded or structured multisensory messages, comprising:

receiving and decoding user-input commands for the composition of one or more multisensory objects into a structured multisensory message for presentation, wherein the user-input commands are created by a user using an intuitive authoring tool and including one or more shorthand instruction codes drawn from a digital composition codebook, wherein the digital composition codebook is a construction regimen of instruction codes which are system- or user-predefined, pre-recorded, or formulated in real-time by a user through a combination of buttons, actions, or gestures, and are learned by a combination of a user input device or the rich message server, utilizing signal processing and machine learning techniques, wherein the one or more shorthand codes are composition instructions that define how the one or more multisensory objects are to be composed for presentation in the structured multisensory message;

interpreting or learning a meaning of the user-input commands by context or training;

compositing the one or more multisensory objects into a structured multisensory message in accordance with the user input commands consistent with the capabilities of a receiving device and network connections to be used; and encoding and forwarding the composited multisensory message for presentation on an end-user's device.

18. The method of claim 17, wherein the one or more shorthand codes are used to integrate multiple multisensory objects for presentation.

19. The method of claim 17, wherein the rich message server learns the interpretation of the one or more shorthand codes.

20. The method of claim 17, wherein the rich message server encodes the composited multisensory message for presentation on the end-user's device.

21. The method of claim 17, wherein the user-input commands are for the presentation of multisensory objects that represent more than two different senses.

22. A method of using an end-user device to present a digital composition coded or structured multisensory message, comprising:

receiving and decoding a composited multisensory message from a rich message server, the composited multisensory message being composited at the rich message server from one or more multisensory objects according to commands input by a user of a sending device, wherein the commands are created using an intuitive authoring tool and including one or more shorthand instruction codes drawn from a digital composition codebook, wherein the digital composition codebook is a construction regimen of instruction codes which are system- or user-predefined, pre-recorded or are formulated in real-time by the user of the sending device through a combination of buttons, actions, or gestures, and are learned by a combination of the sending device and a rich message server, utilizing signal processing and machine learning techniques, wherein the one or more shorthand instruction codes are composition instructions that define how the one or more multi sensory objects are to be composed at the rich message server and composited for presentation at the end-user device; and converting and rendering the structured multisensory message into a rich sensory experience as defined by the user of the sending device, scaled to the capabilities of the end-user device.

23. The method of claim 22, further comprising editing the composited multisensory message for presentation on the end-user device according to limitations and user settings of the end-user device.

24. The method of claim 22, wherein at least one of the one or more multisensory objects is available from the end-user device.

25. The method of claim 24, wherein at least one of the one or more multisensory objects is stored at the end-user device.

26. The method of claim 24, wherein at least one of the one or more multisensory objects is a live camera feed.

27. The method of claim 22, wherein the multisensory objects to be presented represent more than two different senses.

28. A system for communicating digital composition coded or structured multisensory messages, comprising:

a user device for receiving a set of user input commands using coded instructions for composing a structured multisensory message from one or more multisensory objects, wherein the multisensory objects include a combination of live sensor feeds or stored data residing at the user device (user data) or at a remote server (server-side data), wherein the user-input commands are created using an intuitive authoring tool and including one or more shorthand instruction codes drawn from a digital composition codebook, wherein the digital composition codebook is a construction regimen of instruction codes which are system- or user-predefined, pre-recorded, or are formulated in real-time by the user of the user device through a combination of buttons, actions, or gestures, and are learned by a combination of the user input device and the rich message server, utilizing signal processing and machine learning techniques, wherein the one or more shorthand codes are composition instructions that define how the one or more multisensory objects are to be composed for presentation at a receiving device, and for encoding and communicating the combination of user input commands, user data and references to server-side data to a rich message server;

a rich message server for receiving and decoding the user input commands, the user data, and any references to server-side data from the remote user device, for interpreting or learning a meaning of the user input commands having one or more shorthand instruction codes through context or training, for organizing the combination of multisensory objects in or referenced by the user data and server-side data, for compositing the one or more multisensory objects into a structured multisensory message in accordance with the user input commands for presentation on the receiving device and consistent with the capabilities of the receiving device and network connections; and for encoding and communicating the structured multisensory message to the receiving device; and a receiving device for receiving and decoding a structured multisensory message from the rich message server and for converting and rendering the structured multi sensory message into a rich sensory experience as defined by the user, scaled to the capabilities of the receiving device.

29. The system of claim 28, wherein the rich message server is configured to store at least one of the one or more multisensory objects.

30. The system of claim 28, wherein the user-input commands are user-specific and the interpretation of the user-input commands is learned by the rich message server.

31. The system of claim 28, wherein the rich message server is configured to edit the presentation of the composited multisensory message according to the capabilities of the receiving device.

32. The system of claim 28, wherein the multisensory objects to be presented represent more than two different senses.

*33. A computer-implemented method for generating structured multisensory messages, the method comprising:*

*receiving one or more of user input commands and one or more multisensory objects, a multisensory object comprising a digital representation of one or more sensory signals;*

*decoding the user input commands based on a plurality of instruction codes of a digital composition codebook; and*

*compositing a structured multisensory message from the one or more multisensory objects by organizing the one or more multisensory objects into the structured multisensory message, the structured multisensory message composed based on the user input commands and being consistent with at least one of capability of a receiving device and network conditions.*

*34. The method of claim 33, wherein a multisensory object includes a combination of one or more live sensor feeds and sensory data stored at a computer server.*

*35. The method of claim 33, wherein compositing the structured multisensory message comprising:*

*multiplexing a first video clip with an audio clip into a composite video;*

*fading in the composite video for a predetermined period of time;*

*fading out the composite video and fading in a second video clip; and*

*generating the structured multisensory message, the structured multisensory message comprising instructions for combining the first video clip, the audio clip and the second video clip and presenting the structured multisensory message at the receiving device.*

*36. The method of claim 33, wherein compositing the structured multisensory message further comprising:*

*compressing a live sensor feed of media represented by one or more sensory signals;*

*multiplexing the compressed live sensor feed of media with a stored media clip into a composite media;*

*generating the structured multisensory message, the structured multisensory message comprising instructions for combining the live sensor feed of media with the stored media clip and presenting the structured multisensory message at the receiving device.*

*37. The method of claim 33, wherein the digital composition book includes a plurality of instruction codes that define how to encode the one or more multisensory objects into the structured multisensory message for presentation at the receiving device.*

*38. A computer-implemented method of communicating user input for communicating structured multisensory messages, the method comprising:*

*receiving one or more user input commands and one or more multisensory objects, a multisensory object comprising a digital representation of one or more sensory signals;*

*compositing and encoding the one or more multisensory objects into a structured multisensory message, the structured multisensory message being consistent with at least one of capability of a receiving device and network conditions; and*

*transmitting the structured multisensory message to the receiving device, wherein the receiving device is adapted to present the multisensory message in a scaled format defined by the capability of the receiving device.*

*39. The method of claim 38, wherein the user input commands are received using at least one of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

*40. The method of claim 38, further comprising decoding the user input commands using a signal processing technique.*

*41. The method of claim 38, further comprising decoding the user input commands using a machine learning technique.*

*42. The method of claim 38, wherein transmitting the structured multisensory message to the receiving device comprises:*

*responsive to the structured multisensory message comprising stored multisensory objects, transmitting instructions on decoding the structured multistory message on the receiving device.*

*43. The method of claim 42, wherein the instructions for decoding the structured multisensory message comprise instructions for combining and presenting the stored multisensory objects on the receiving device.*

*44. The method of claim 38, wherein transmitting the structured multisensory message to the receiving device comprises:*

*responsive to the structured multisensory message comprising one or more stored multisensory objects and at least one live sensor feed of media, transmitting compressed live sensor feed of media and instructions on decoding the structured multisensory message on the receiving device.*

*45. The method of claim 44, wherein the instructions for decoding the structured multisensory message comprise instructions for:*

*decompressing the compressed live sensor feed of media;*
*combining decompressed live sensor feed of media with the one or more stored multisensory objects into a composite media; and*
*transmitting the composite media to the receiving device.*

*46. A computer system for generating structured multisensory messages, the system comprising:*

*a computer processor configured to perform steps comprising:*

*receiving one or more user input commands and one or more multisensory objects, a multisensory object comprising a digital representation of one or more sensory signals;*

*decoding the user input commands based on a plurality of instruction codes of a digital composition codebook; and*

*compositing a structured multisensory message from the one or more multisensory objects by organizing the one or more multisensory objects into the structured multisensory message, the structured multisensory message composed based on the user input commands and being consistent with at least one of capability of a receiving device and network conditions.*

*47. The system of claim 46, wherein a multisensory object includes a combination of one or more live sensor feeds and sensory data stored at a computer server.*

*48. The system of claim 46, wherein compositing the structured multisensory message comprises:*

*multiplexing a first video clip with an audio clip into a composite video;*
*fading in the composite video for a predetermined period of time;*
*fading out the composite video and fading in a second video clip; and*
*generating the structured multisensory message, the structured multisensory message comprising instructions for combining the first video clip, the audio clip and the second video clip and presenting the structured multisensory message at the receiving device.*

*49. The system of claim 46, wherein compositing the structured multisensory message comprises:*

*compressing a live sensor feed of media represented by one or more sensory signals;*
*multiplexing the compressed live sensor feed of media with a stored media clip into a composite media;*
*generating the structured multisensory message, the structured multisensory message comprising instructions for combining the live sensor feed of media with the stored media clip and presenting the structured multisensory message at the receiving device.*

*50. The system of claim 46, wherein the digital composition book includes a plurality of instruction codes that define how to encode the one or more multisensory objects into the structured multisensory message for presentation at the receiving device.*

*51. A computer system for communicating user input for communicating structured multisensory messages, the system comprising:*

*a computer processor configured to perform steps comprising:*

*receiving one or more user input commands and one or more multisensory objects, a multisensory object comprising a digital representation of one or more sensory signals;*

*compositing and encoding the one or more multisensory objects into a structured multisensory message, the structured multisensory message consistent with at least one of capability of a receiving device and network conditions; and*

*transmitting the structured multisensory message to the receiving device, wherein the receiving device is adapted to present the multisensory message in a scaled format defined by the capability of the receiving device.*

*52. The system of claim 51, wherein the user input commands are received using at least one of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

*53. The system of claim 51, further comprising decoding the user input commands using a signal processing technique.*

*54. The system of claim 51, further comprising decoding the user input commands using a machine learning technique.*

*55. The system of claim 51, wherein transmitting the structured multisensory message to the receiving device comprises:*

*responsive to the structured multisensory message comprising stored multisensory objects, transmitting instructions on decoding the structured multistory message on the receiving device.*

*56. The system of claim 55, wherein the instructions for decoding the structured multisensory message comprise instructions for combining and presenting the stored multisensory objects on the receiving device.*

*57. The system of claim 51, wherein transmitting the structured multisensory message to the receiving device comprises:*

*responsive to the structured multisensory message comprising one or more stored multisensory objects and at least one live sensor feed of media, transmitting compressed live sensor feed of media and instructions on decoding the structured multisensory message on the receiving device.*

*58. The system of claim 57, wherein the instructions for decoding the structured multisensory message comprise instructions for:*

*decompressing the compressed live sensor feed of media;*

*combining decompressed live sensor feed of media with the one or more stored multisensory objects into a composite media; and*

*transmitting the composite media to the receiving device.*

*59. An apparatus for encoding user input commands for structured multisensory messages, the apparatus comprising:*

*a computer processor for performing steps comprising:*

*receiving one or more user input commands and one or more multisensory objects, a multisensory object comprising a digital representation of one or more sensory signals;*

*encoding the set of user input commands and references of the one or more multisensory objects into user input data; and*

*providing the user input data to a computer server to generate structured multisensory messages.*

*60. The user input device of claim 59, wherein the user input commands are received using at least one of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

*61. The apparatus of claim 59, wherein the user input commands are created using an authoring tool having one or more shorthand instruction codes included in a digital composition codebook.*

*62. The apparatus of claim 59, wherein the computer processor is further for:*

*receiving the structured multisensory messages from the computer server and presenting the structured multisensory messages to a user.*

*63. The apparatus of claim 62, wherein presenting a structured multisensory message comprises:*

*rendering the structured multisensory message into a rich message based on the user commands;*

*scaling the rich message responsive to the capabilities of a receiving device; and*

*presenting the rich messages to a user of the receiving device.*

*64. The apparatus of claim 62, wherein presenting a structured multisensory message further comprises editing the structured multisensory message for presentation on the receiving device responsive to limitations and user settings of the receiving device.*

*65. The apparatus of claim 62, wherein presenting a structured multisensory message comprises:*

*decompressing compressed live sensor feed of media;*

*combining the decompressed live sensor feed of media with one or more stored multisensory objects into a composite media; and*

*presenting the composite media to a user of the receiving device.*

*66. The user input device of claim 59, wherein the user input commands are received using at least two of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

*67. The user input device of claim 59, wherein the user input commands are received using at least three of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

*68. The user input device of claim 59, wherein the user input commands are received using at least four of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

*69. The user input device of claim 59, wherein the user input commands are received using at least five of following:*

*tactile input by the user;*
*live feed from a camera;*
*voice commands;*
*hand configurations of the user;*
*eye movements of the user;*
*handwritings of the user;*
*finger or hand movements of the user;*
*facial movements of the user; and*
*body movements of the user.*

* * * * *